A. F. PRIEST.
VEHICLE WHEEL.
APPLICATION FILED MAR. 17, 1911.

1,030,610.

Patented June 25, 1912.

2 SHEETS—SHEET 1.

Witnesses:

Inventor
Augustus F. Priest
By Dyrenforth, Lee, Chritton & Wiles
Attys.

A. F. PRIEST.
VEHICLE WHEEL.
APPLICATION FILED MAR. 17, 1911.
1,030,610.
Patented June 25, 1912.
2 SHEETS—SHEET 2.
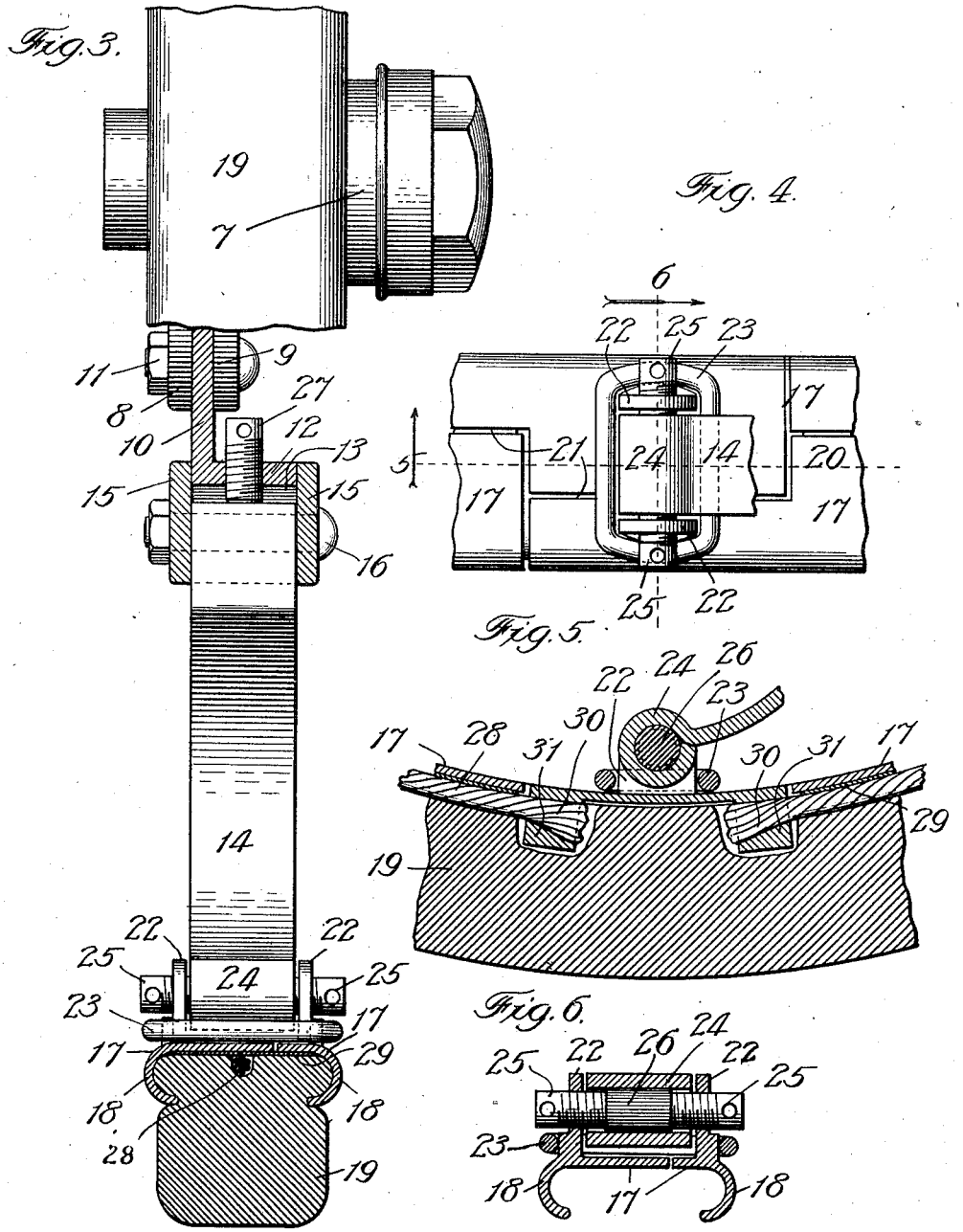

UNITED STATES PATENT OFFICE.

AUGUSTUS F. PRIEST, OF CHICAGO, ILLINOIS.

VEHICLE-WHEEL.

1,030,610.  Specification of Letters Patent.  Patented June 25, 1912.

Application filed March 17, 1911. Serial No. 615,036.

*To all whom it may concern:*

Be it known that I, AUGUSTUS F. PRIEST, a citizen of the United States, residing at Chicago, in the county of Cook and State of Illinois, have invented a new and useful Improvement in Vehicle-Wheels, of which the following is a specification.

My invention relates to improvements in vehicle-wheels of the type employing a sectional rim with springs interposed between the hub of the wheel and the rim for resiliently connecting these members together; and my object, generally stated, is to provide improvements in wheels of the type referred to to the end of rendering them better adapted for satisfactorily performing the service required of them, and specifically to provide improvements which will afford to the wheel the resiliency required and render the wheel economical of manufacture and durable.

My invention is illustrated in the accompanying drawings, in which—

Figure 1:
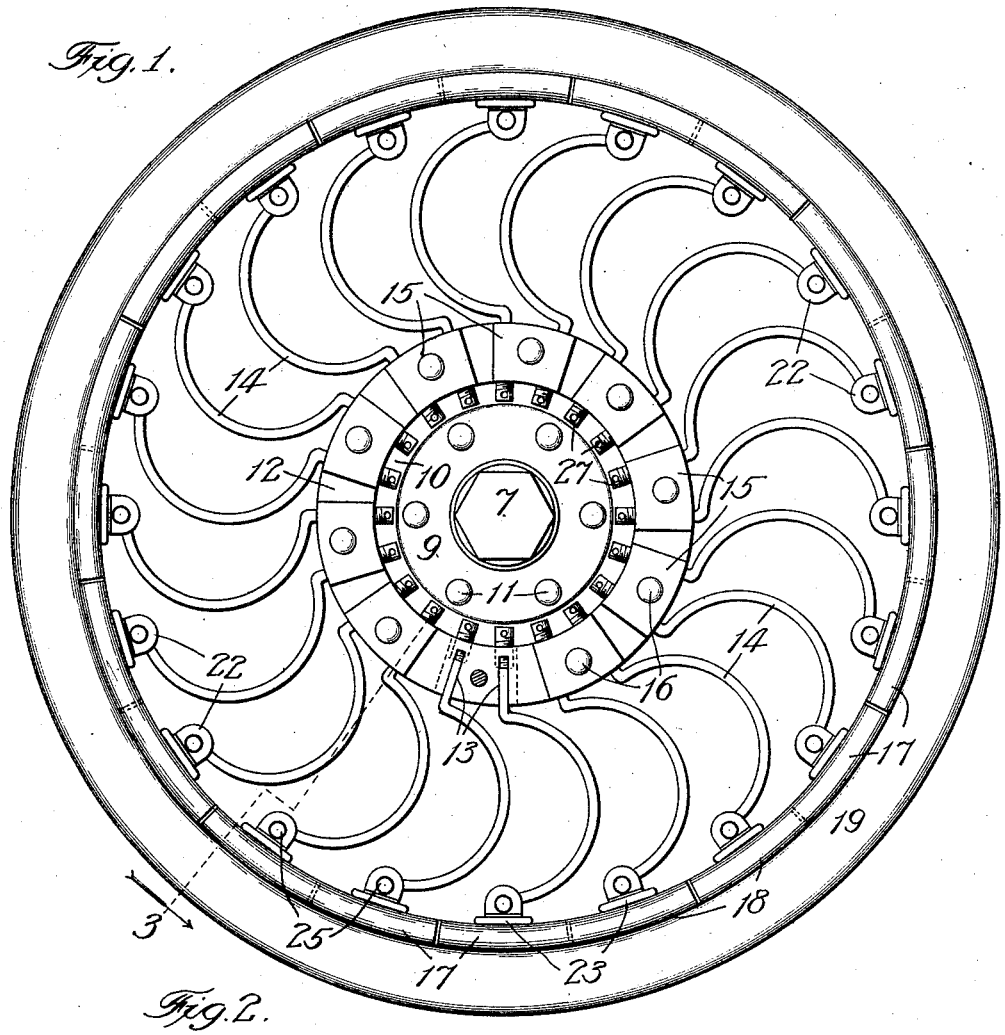
Figure 2:
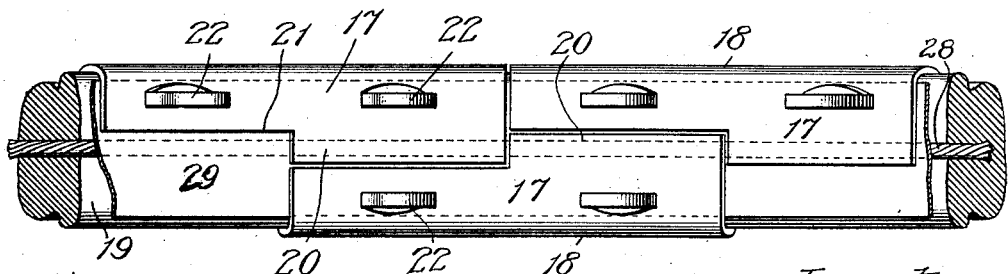

Figure 1 is a face view of a wheel constructed in accordance with my invention. Fig. 2 is an enlarged broken plan view of the inner side of the wheel rim, with the attaching means for the springs and the means for preventing lateral displacement of the rim sections, removed. Fig. 3 is an enlarged section taken at the irregular line 3 on Fig. 1 and viewed in the direction of the arrow. Fig. 4 is a broken plan view of a portion of the inner side of the wheel-rim showing a part of one of the springs and the manner in which it is secured to the rim. Fig. 5 is a section taken at the line 5 on Fig. 4 and viewed in the direction of the arrow; and Fig. 6, a section taken at the line 6 on Fig. 4 and viewed in the direction of the arrow, the tire being removed.

The hub of the wheel is represented at 7 and is formed with an annular flange 8 between which and a ring 9 surrounding the hub an annular plate 10 of larger diameter than the flange 8 and ring 9, is secured as by bolts 11. The plate 10 is provided peripherally with an off-set ring-section 12 concentric with the axis of the hub and containing an annular series of radially-extending, equidistantly-spaced slots 13 extending transversely of the ring 12. Projecting at their inner, straight, ends into the slots 13 to extend radially of the wheel axis, are bow-shaped springs 14, and located at opposite sides of the ring 12 are annular series of plates 15, each plate extending across the inner ends of two of the springs 14, as represented in Fig. 1, and between which plates the springs are rigidly clamped in the slots 13 as by bolts 16 extending through these plates and the ring 12 for preventing lateral displacement of the springs when the wheel is in use.

The rim of the wheel is formed of relatively movable sections 17 provided along their outer edges with undercut, tire-engaging flanges 18 for receiving a tire surrounding the rim and represented at 19, each of the sections 17 extending beyond the median line of the rim, as represented at 20 and cut away for approximately one-half of its length to present a recess 21. The sections 17 are made in rights and lefts and are so arranged relatively to each other, as represented, as to cause the wider portions 20 of the sections to lie within the recesses 21 of the adjacent sections whereby a portion of each section 17 overlaps the median line of the rim, for the purpose hereinafter explained. Each section 17 carries on its inner face toward its opposite ends lugs 22, these lugs being so arranged that the ones on adjacent sections 17 will oppose each other, as represented in Fig. 2.

The sections of the rim 17 are held together against lateral displacement and in rigid clamping engagement with the tire 19, as represented in Figs. 3 and 4, by means of links 23 which embrace opposing lugs and thus connect together the lateral overlapping portions of adjacent rim-sections, as represented in Figs. 4, 5 and 6.

The outer ends of the springs 14 are curled to present eyes 24 which extend transversely of the wheel-rim into the spaces between the opposed lugs 22 and are held to the rim as by screw-studs 25 which screw into the lugs 22 from opposite sides of the rim and project into the eyes 24, the eye-equipped ends of the springs 14 being preferably of less width than the width of the space between opposing lugs, as represented in Fig. 6. The studs 25 which serve to prevent accidental disengagement of the links 23 from the lugs 22, are preferably of less diameter than the internal diameter of the eyes 24 and screw at their inner ends against the ends of blocks 26, of cylindrical shape in cross-section, and formed of rubber or any other suitable expansible resilient material, these blocks being caused to extend peripherally against the inner surfaces of the eyes 24 when the studs are screwed into the lugs 22, whereby the edges of the springs 14 are held at all times out of contact with the inner walls of the lugs between which they extend.

The springs 14 are preferably initially assembled with the other parts of the wheel under practically no tension and after such initial assembling are placed under compression tension, as by means of set-screws 27 which screw into the ring 12 from its inner side and extend into the slots 13, the screws 27 bearing against the inner ends of the springs 14, as represented in Figs. 1 and 3.
It is preferred that the bolts 16 for the plates 15 remain in loosened condition until the springs 14 have been adjusted in the wheel, by manipulating the set-screws 27 for placing the springs under the desired tension, whereupon these bolts should be tightened for clamping the inner ends of the springs between the plates 15. It will be understood that the degree of tension under which the springs 14 are normally placed will vary with the weight to be supported by the wheel when in use and that the springs may be compressed to any desired tension by manipulating the set-screws 27. Placing the springs 14 under compression tension tends to spread the rim-sections 17 apart circumferentially and thus stretch the tire 19 and as such action upon the tire is objectionable, I provide means for preventing such circumferential displacement of the rim-sections, a preferred form of such means comprising a cable 28 which extends about the outer periphery of the rim and is rigidly secured at its ends to the latter to hold it in taut condition, it being preferred that the cable bear against a strip 29 of metal interposed between the cable and the sections 17, as illustrated in Fig. 3. The cable 28 may be secured at its ends to the rim in any suitable manner. In the construction shown, the ends of the cable extend into tapering openings 30 in lugs 31 carried on the outer face of one of the rim-sections 17 and extending into recesses in the tire, the cable-ends being expanded to the position shown in Fig. 5 for rigidly fastening them to the lugs 31, as by driving tapering pins, not shown, into the ends of the cable, as is well known in the art. In practice, the cable 28 would be fitted to a templet of the proper diameter and the ends of the cable secured in the rim-section carrying the studs 31, before the cable is assembled with the other parts of the rim-sections.

The provision of the blocks 26 of expansible material which serve to hold the springs out of contact with the lugs 22 and studs 25, avoids the rubbing of the springs 14 against metallic parts of the wheel, thereby preventing undue wear and noise in the operation of the latter. Furthermore, by using two studs 25 for each pair of lugs 22, instead of a single bolt, or the like, danger of impairment to the wheel, as by shearing of the means for attaching the springs to the rim, under the slight movement of adjacent rim-sections in opposite directions when the wheel is in use, due to the slight distortion of the wheel as it rolls over the ground, is prevented.

It will be understood that when the wheel, in use, strikes an uneven portion of the road, the impact received by the wheel forces the latter into slightly elliptical form, the tension of the springs above the plane in which the wheel-axis extends becoming reduced somewhat below the normal tension, and thereby affording to the wheel a degree of resiliency sufficient to prevent its rebounding on the road. The feature of adjusting the springs as described is of advantage in a case of this character, as it permits of the placing of the springs under any desired tension and provides for the "truing" of the wheel.

While I have illustrated and described a particular form of construction embodying my invention, I do not wish to be understood as intending to limit it to such embodiment, as various changes and alterations may be made therein without departing from the spirit of my invention.

What I claim as new and desire to secure by Letters Patent, is—

1. In a spring-wheel, the combination of a hub-portion, a rim formed of a circumferential series of relatively movable, laterally-overlapping sections each of said sections being of less width than said rim, and the overlapping portions of said sections being of different widths, whereby the line of overlap is non-coincident with the center line of the rim, a tire confined about said rim, springs connecting together said hub-portion and rim, and a cable, held against expansion, confined about said rim and overlapped by each of said rim-sections, said cable being embedded in said tire.

2. In a spring-wheel, the combination of a hub-portion, a rim formed of a circumferential series of relatively-movable, laterally-overlapping sections, each of which is of less width than the rim, the overlapping portions of said sections being of different widths, whereby the line of overlap is non-coincident with the center line of the rim, a tire confined about said rim, springs connecting together said hub-portion and rim, and a cable extending about said rim and anchored at opposite ends to one of said rim-sections, a portion of each of said rim-sections overlapping said cable, said cable being embedded in said tire, for the purpose set forth.

3. In a spring-wheel, the combination of a hub-portion, a rim formed of a circumferential series of relatively-movable laterally-overlapping sections each of less width than said rim, the overlapping portions of said sections being of different widths whereby the line of overlap is non-coincident with the center line of the rim, a band extending about the periphery of said rim, a tire confined about said rim, springs connecting together said hub-portion and rim, and a cable extending about the rim and against said band and held against expansion in a position to be overlapped by each of said rim-sections, said cable being embedded in said tire.

4. A spring-wheel comprising, in combination, a hub-portion, a rim formed of a circumferential series of relatively-movable, laterally-overlapping, sections, a tire confined about said rim, lugs carried on the inner sides of said sections with the lugs on adjacent sections opposing each other, links connecting together opposing lugs for preventing said rim-sections from spreading apart laterally, and springs connecting together said hub-portion and rim, for the purpose set forth.

5. A spring-wheel comprising, in combination, a hub-portion, a rim formed of a circumferential series of relatively-movable, laterally-overlapping, sections, a tire confined about said rim, lugs carried on the inner sides of said sections with the lugs on adjacent sections opposing each other, links connecting together opposing lugs for preventing said rim-sections from spreading apart laterally, studs carried by said lugs and overlapping said links, and springs engaging with said hub-portion and held to said rim by said studs, for the purpose set forth.

6. A spring-wheel comprising, in combination, a hub-portion, a rim formed of a circumferential series of relatively-movable, laterally-overlapping, sections, a tire confined about said rim, lugs carried on the inner sides of said sections with the lugs on adjacent sections opposing each other, links connecting together opposing lugs for preventing said rim-sections from spreading apart laterally, studs screwed into said lugs from opposite sides thereof to overlap said links, and springs engaging with said hub-portion and provided at their outer ends with eyes into which said studs extend for connecting said springs with the rim.

7. In a spring-wheel, the combination of a hub-portion, a rim formed of a circumferential series of relatively-movable sections, a tire confined about said rim, lugs carried on the inner sides of said sections and opposing each other, relatively adjustable studs connected with said opposing lugs, springs connected with said hub at their inner ends and equipped at their outer ends with eyes into which said studs extend, and blocks of expansible material located between the ends of said studs and expanded thereby into engagement with the inner surfaces of said eyes, for the purpose set forth.

8. In a spring-wheel, the combination of a hub-portion, a rim formed of a circumferential series of relatively-movable, laterally-overlapping, sections, a tire confined about said rim, lugs carried on the inner sides of said sections, with the lugs on adjacent sections opposed and spaced apart, relatively adjustable studs connected with said opposing lugs, springs connected with said hub at their inner ends, the outer ends of said springs being eye-shaped and of less width than the spaces between opposing lugs into which spaces the springs extend, blocks of expansible material located in said eyes and between the inner ends of opposing studs and expanded into frictional engagement with the eye-portions of said springs, and means engaging with opposed lugs for holding said rim-sections against lateral displacement, for the purpose set forth.

9. A spring-wheel comprising, in combination, a hub-portion, a rim formed of a circumferential series of relatively-movable, laterally-overlapping sections, said rim being provided about its inner periphery with opposed lugs, a cable, held against expansion, confined about said rim and overlapped by each of said rim-sections, springs connecting together said hub-portion and rim, means connecting the outer ends of said springs with said opposing lugs, and means connecting opposing lugs together for holding said rim-sections against lateral displacement, for the purpose set forth.

10. A spring-wheel comprising, in combination, a hub-portion, a rim formed of a circumferential series of relatively-movable, laterally-overlapping sections, springs connecting together said hub-portion and rim, a cable, held against expansion, confined about said rim and overlapped by each of said rim-sections, opposing lugs provided on said rim-sections to extend about the inner periphery of said rim, means connecting said springs at their outer ends to said opposing lugs, and links connecting together opposing lugs for preventing lateral displacement of said rim-sections.

11. In a spring-wheel, the combination of a hub-portion, a rim formed of a circumferential series of relatively-movable laterally-overlapping sections, each of less width than said rim, the overlapping portions of said sections being of different widths whereby the line of overlap is non-coincident with the center line of the rim, a tire confined about said rim, springs connecting together said hub-portion and rim, and a cable extending about the rim and held against expansion in a position to be overlapped by each of said rim-sections.

AUGUSTUS F. PRIEST.

In presence of—
J. G. ANDERSON,
R. A. SCHAEFER.